(12) United States Patent
Boudalier

(10) Patent No.: US 8,938,759 B2
(45) Date of Patent: Jan. 20, 2015

(54) PROGRAM GUIDE AND APPARATUS

(75) Inventor: Pascal Boudalier, Grenoble (FR)

(73) Assignee: Hewlett-Packard Development Company, L.P., Houston, TX (US)

(*) Notice: Subject to any disclaimer, the term of this patent is extended or adjusted under 35 U.S.C. 154(b) by 257 days.

(21) Appl. No.: 13/063,431

(22) PCT Filed: Sep. 3, 2009

(86) PCT No.: PCT/EP2009/061403
§ 371 (c)(1),
(2), (4) Date: Mar. 10, 2011

(87) PCT Pub. No.: WO2010/029011
PCT Pub. Date: Mar. 18, 2010

(65) Prior Publication Data
US 2011/0173663 A1 Jul. 14, 2011

(30) Foreign Application Priority Data

Sep. 11, 2008 (EP) .................... 08300268

(51) Int. Cl.
H04N 5/445 (2011.01)
H04H 60/72 (2008.01)
H04N 21/258 (2011.01)
H04N 21/2668 (2011.01)
H04N 21/45 (2011.01)
H04N 21/466 (2011.01)
H04N 21/475 (2011.01)
H04N 21/482 (2011.01)

(52) U.S. Cl.
CPC ......... *H04H 60/72* (2013.01); *H04N 21/25841* (2013.01); *H04N 21/25891* (2013.01); *H04N 21/2668* (2013.01); *H04N 21/4524* (2013.01); *H04N 21/4532* (2013.01); *H04N 21/4668* (2013.01); *H04N 21/4755* (2013.01); *H04N 21/4826* (2013.01)
USPC ................... 725/46; 725/44; 725/45; 725/47; 725/9; 725/10

(58) Field of Classification Search
USPC .......................................... 725/9, 10, 32–47
See application file for complete search history.

(56) References Cited

U.S. PATENT DOCUMENTS

| 6,182,094 B1 * | 1/2001 | Humpleman et al. ......... 715/234 |
| 2002/0133821 A1 * | 9/2002 | Shteyn .......................... 725/46 |

(Continued)

FOREIGN PATENT DOCUMENTS

EP 1 868 385 * 12/1997

OTHER PUBLICATIONS

International Search Report cited in PCT/EP2009/061403; dated Mar. 18, 2010; 3 pages.

*Primary Examiner* — Pankaj Kumar
*Assistant Examiner* — Timothy Newlin

(57) ABSTRACT

A server 10 generates a program guide from a content database 20. The data base contains content descriptions including an identification of the content and the recommender of that content, which may be obtained from messages 12. A dynamic resource server 22 obtains dynamic information relating to at least one user including details of which devices, if any, are presently being used by the user as well as properties of devices associated with the user. A program guide generator 24 produces a program guide from the content descriptions and from the dynamic information, and outputs the program guide.

15 Claims, 4 Drawing Sheets

(56) References Cited

U.S. PATENT DOCUMENTS

| | | | |
|---|---|---|---|
| 2002/0138831 A1* | 9/2002 | Wachtfogel et al. | 725/32 |
| 2003/0149978 A1* | 8/2003 | Plotnick | 725/39 |
| 2004/0073915 A1* | 4/2004 | Dureau | 725/9 |
| 2005/0055713 A1* | 3/2005 | Lee et al. | 725/46 |
| 2005/0251827 A1* | 11/2005 | Ellis et al. | 725/47 |
| 2006/0101498 A1* | 5/2006 | Arling et al. | 725/81 |
| 2006/0161950 A1* | 7/2006 | Imai et al. | 725/46 |
| 2006/0179419 A1* | 8/2006 | Narahara et al. | 717/109 |
| 2006/0248557 A1* | 11/2006 | Stark et al. | 725/37 |
| 2007/0006265 A1* | 1/2007 | Youm et al. | 725/46 |
| 2007/0054634 A1* | 3/2007 | Seppala | 455/121 |
| 2007/0124789 A1* | 5/2007 | Sachson et al. | 725/117 |
| 2007/0214470 A1* | 9/2007 | Glasgow et al. | 725/10 |
| 2008/0155596 A1* | 6/2008 | Rosberg et al. | 725/39 |
| 2008/0172709 A1* | 7/2008 | Ryu et al. | 725/114 |
| 2008/0244681 A1* | 10/2008 | Gossweiler et al. | 725/133 |
| 2009/0067812 A1* | 3/2009 | Park | 386/95 |
| 2009/0100469 A1* | 4/2009 | Conradt et al. | 725/46 |
| 2009/0235169 A1* | 9/2009 | Cheng | 715/719 |
| 2009/0249418 A1* | 10/2009 | Alastruey Gracia et al. | 725/114 |
| 2009/0271820 A1* | 10/2009 | Choi et al. | 725/37 |
| 2010/0107201 A1* | 4/2010 | Hannum et al. | 725/99 |
| 2011/0113448 A1* | 5/2011 | Scheelke et al. | 725/47 |
| 2013/0247096 A1* | 9/2013 | Miller et al. | 725/34 |

* cited by examiner

PROGRAM GUIDE AND APPARATUS

RELATED ART

An increasing number of multimedia data items and content in general terms is available from a wide variety of sources. Conventional terrestrial broadcasters broadcast content in a number of ways, both by broadcast transmission and through the internet. However, increasing amounts of content are being provided from non-traditional sources, including an ever-increasing amount of user-generated content, much of which is of highly variable quality.

The increasing amount of content creates difficulty for users in finding content that they might wish to view. For commercial content, program guides already exist, including for example electronic program guides that may be transmitted by broadcasters, especially for digital television channels.

However, finding interesting user-generated content from non-commercial sources is more difficult.

BRIEF DESCRIPTION OF DRAWINGS

For a better understanding of the invention, embodiments will be described, purely by way of example, with reference to the accompanying drawings, in which.

The figures are schematic and not to scale. The same or similar components are given the same reference number in different figures and the description relating thereto is not necessarily repeated.

DETAILED DESCRIPTION

Figure 1:
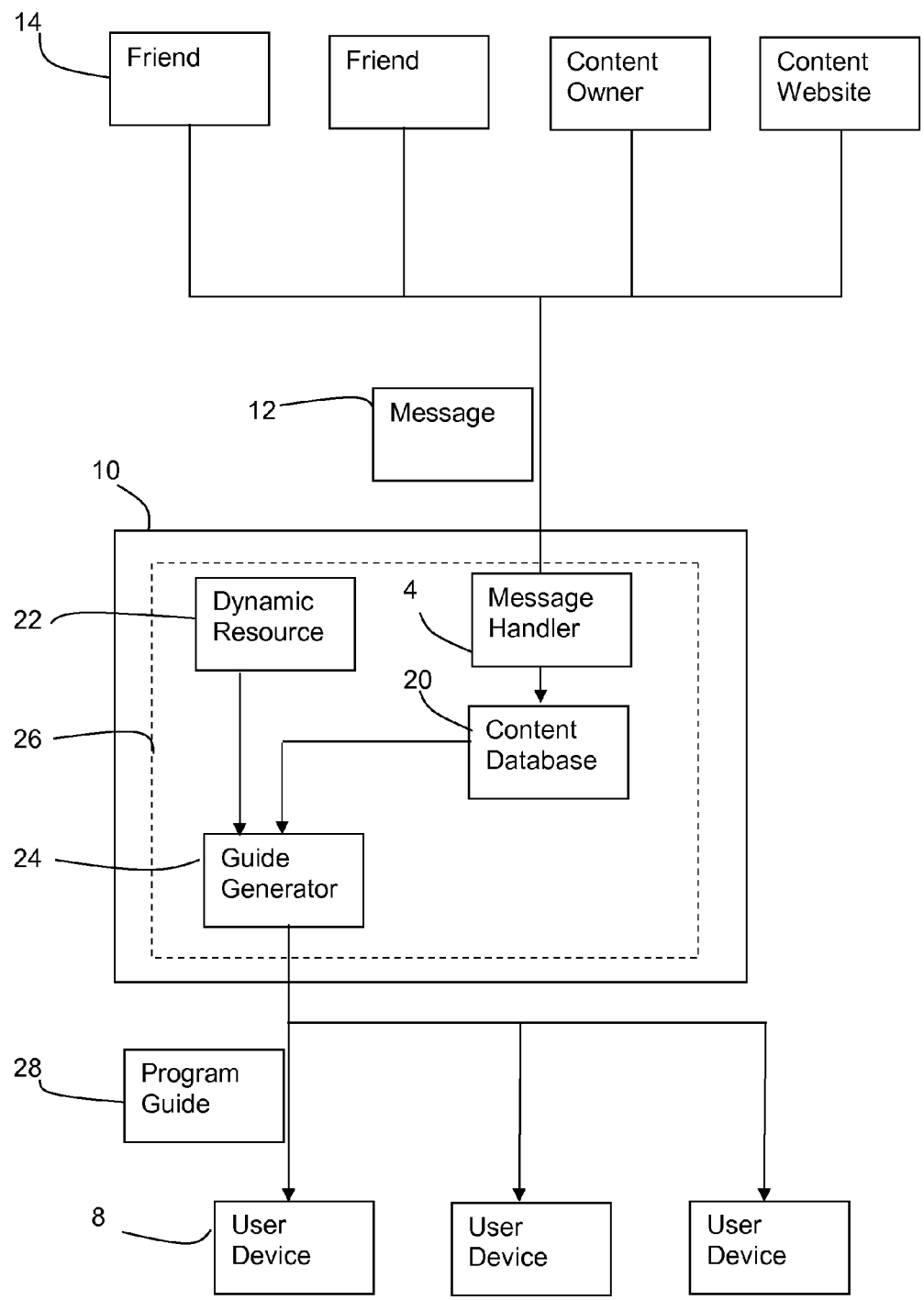
FIG. 1 shows a schematic block diagram of a first embodiment of the invention.
Figure 2:
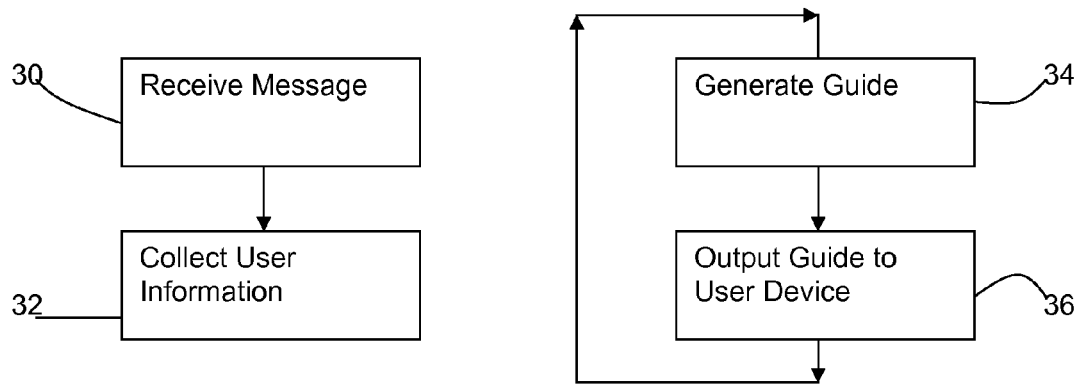
FIG. 2 is a schematic flow diagram of the operation of the first embodiment.

According to a first embodiment, a server 10 contains a database 20 including a number of data items relating to content.

The server 10 also includes a dynamic resource server 22 for obtaining dynamic (and personalized) information regarding one or more users. For each user, the resource server 22 is able to obtain dynamic network data about a device or devices 8 presently being used by a user as well as the location of that device. In this context, "location" does not only refer to physical location but may alternatively or additionally refer to the topological location within a data network.

A guide generating server 24 is provided in the server 10 for generating a guide as will be explained in more detail below.

A message handler 4 is arranged to receive messages recommending content.

In the specific embodiment, both the dynamic resource server 22 and the guide generating server 24 are implemented as respective software processes stored in memory 26 of the server.

In use, the server 10 is arranged to receive (step 30) messages 12 from a number of information sources 14 at a content interface, in the embodiment message handler 4. The information sources 14 may include other users, friends of the user, content providers and/or content aggregators such as websites with user generated content. Each message 12 (FIG. 3) includes a content field 16 for indicating the identity a piece of content, for example a URL (universal resource locator) or in more general terms a URI (universal resource identity). The message also includes a recommender field 18 identifying the identity of the entity recommending that piece of content. The information contained in these messages is stored in content database 20, which accordingly contains information about a number of pieces of content including the identity of the recommenders.

The dynamic resource server 22 collects dynamic information (step 32) about particular users, for example the device presently being used by a user, and passes this on to the guide generating server 24.

In the embodiment the dynamic information includes realtime information about the user's location, either in network terms, geographically, and/or the location of the user within a building. The information may include simple identifiers such as "at home" or "at work". The dynamic information also includes network attachment information of the devices associated with the user, e.g. which devices are presently linked to the internet and/or other information sources.

The dynamic information further includes information about the present status of the user, including for example the user's present availability (available, in a meeting, travelling) and/or the user's present role (working, on holiday).

Further the dynamic information used by the program guide generator includes user preference information relating to the preferences of the user.

The message handling and storing processes are repeated each time a message 12 is received.

The guide generating server (step 34) combines the dynamic information about the user and the database to generate a program guide 28 to the user. The program guide may be a list of recommended content including a description of the content, the identity of the entities making the recommendations, the location of the content identifying that content and allowing access to it, as well as any other data that may be appropriate.

In particular, the program guide 28 may be output (step 36) to each of the devices 8 of a user. The process of generating and outputting the program guide is repeated periodically.

The guide generating server does not just output the program guide based on the recommendations. Instead, it combines the recommendations with the dynamic information provided by dynamic resource server 22. For example, if the dynamic information indicates that the user is presently only using a mobile telephone with a small screen connected through a slow mobile internet connection, the recommended content list will be less likely to list high definition digital content representing complete films; instead short clips which can readily be downloaded and displayed on the small screen will be favoured.

Note that the program guide may include information from multiple sources—not just commercial content or user-generated, but both.

In contrast, if the user is presently using a digital television receiving high definition broadcasts, high definition digital content will be favoured.

For a user using a computer, both film-length content and short clips may be presented in the guide.

Many users will have access to more than one piece of equipment, not all of which may be available, but in the first embodiment a single program guide listing content for viewing on all possibly available devices are provided to each device of the user that can receive data.

It should be noted that the program guide can include data on devices that cannot receive the program guide. For example, the program guide may include broadcast digital TV programs available through a set-top box even though the server 10 may be unable to download the program guide to the set-top box.

The embodiment delivers a way of making available to the user a dynamic, personalized program guide listing with a prioritized list of content, thereby allowing the user to decide which content they will consume, store, or record.

In the embodiment, the output program guide is not just a list of the content and the recommender but includes links and information that allow the user to view the content, store the content, or take appropriate action. This is based on the dynamic information about the devices. For example, a hard drive recorder may be used to record broadcast television services and a link may be provided in the output program guide whereby clicking on the link will simply cause the hard drive recorder to record the program concerned. When the program has been recorded, the recorded program may appear in the guide with a link to cause the recorder to play the content.

It will be appreciated that the capabilities of devices to store and to record the content will vary between devices as well as over time. For example, a mobile telephone may be in an area where there is a fast mobile broadband connection (for example 3.5G) and then may move into an area with a slower link (GPRS). The same variation may be seen in terrestrial links.

Such changing information as well as information that varies less rapidly, such as the screen display size is provided from the dynamic resource server. For example, a mobile telephone may provide the possibility of viewing digital content but at a much lower resolution than a flat-panel display and so a "play" link may have the effect of downloading a lower-resolution version of the same piece of content. Not all information may be available at all times or for all devices.

A further option is provided to the user in the program guide in appropriate circumstances, and that is a forward recommendation option. In this way, a user can forward an item from his own program guide to another user. This feature enhances the ease of use of social interactivity.

Note that the program guide of the embodiment integrates recommendations both about user generated content from websites as well as broadcast and download/streaming content. However, in some cases the program guide may include only one or more types of content.

It will be appreciated that modifications and variations of this embodiment are possible. For example, exactly how the system copes with users with more than one piece of equipment at the same time may vary. The same program guide listing all the options may be sent to each device, indicating which is the most suitable device. Alternatively, a different program guide may be sent to each device focussing on content suitable for that device.

A second embodiment will now be described with reference to FIGS. 3, 4, 5 and 6. The second embodiment shares features of the first embodiment and description of these will not be repeated.

The second embodiment uses a separate message handler 4 connected to the internet 2 that handles incoming messages 12 from a variety of recommenders 14 and stores the messages appropriately formatted in database 20.

Figure 3:
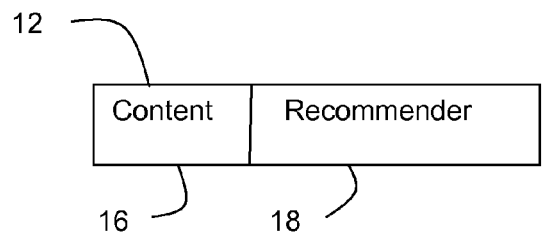
FIG. 3 is a schematic diagram of a message used in the first embodiment.
Figure 4:
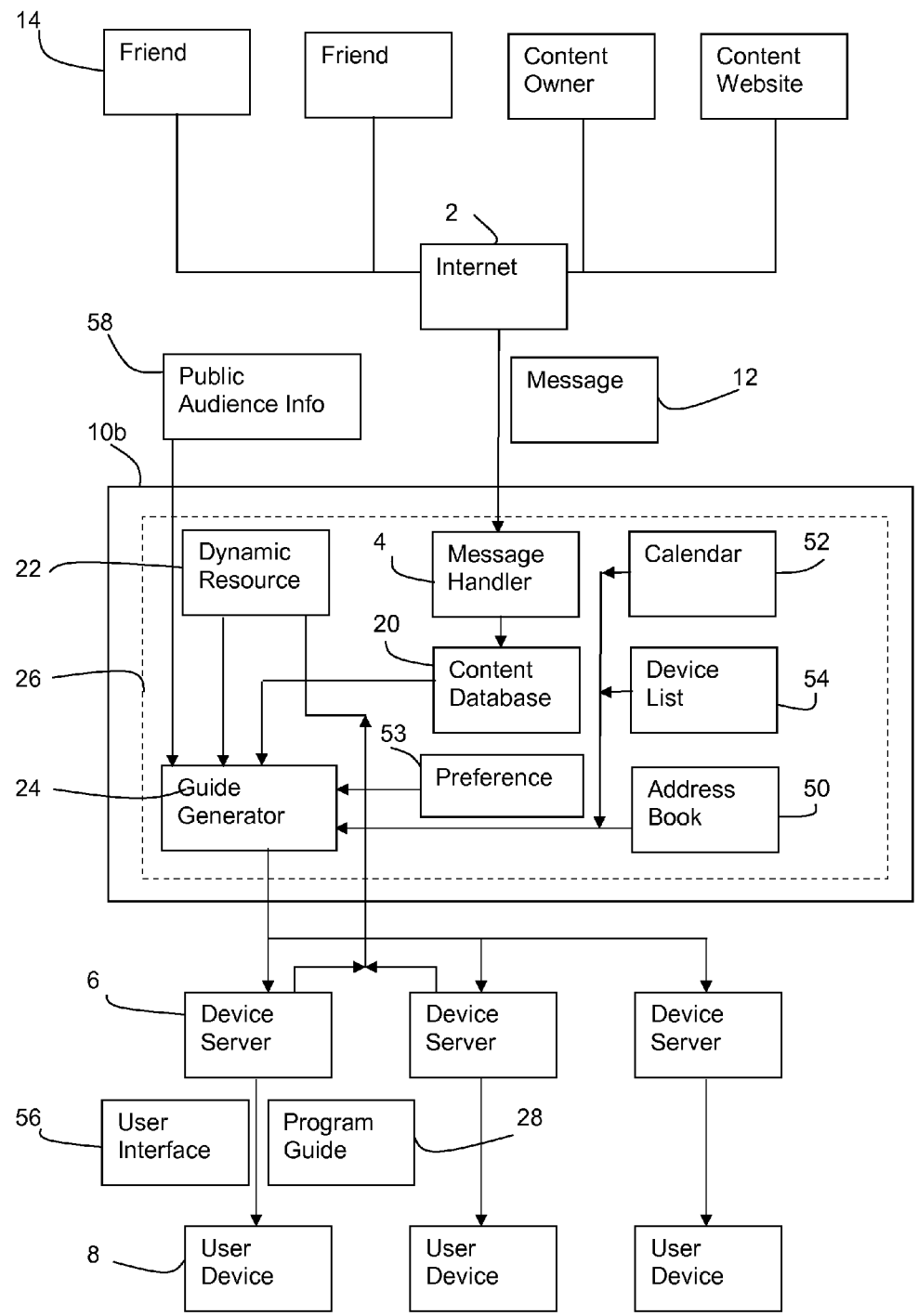
FIG. 4 shows a schematic block diagram of a second embodiment of the invention.
Figure 5:
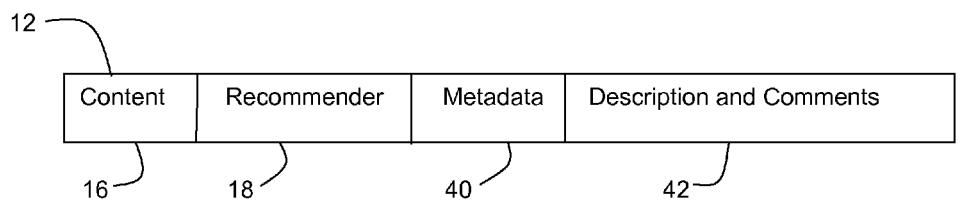
FIG. 5 is a schematic diagram of a message used in the second embodiment.

The second embodiment uses messages 12 with additional data. The format of the message is illustrated in FIG. 3. In particular, as well as the content field 16 and recommender field 18, each message includes also a content metadata field 40 and a content description/comments field 42.

The dynamic network server 22 in this embodiment provides the dynamic information about the location of the user, and for each device the location of the device, the network connectivity, i.e. maximum available bandwidth and present bandwidth, presence (available, in meeting, travelling) and role (at work, in vacation), status information, as well as which if any of the potential devices are presently being used. The dynamic network server of this embodiment obtains the information through the internet 2. Query messages are sent to each user device which are arranged to reply to the query messages with dynamic network information where available.

The server 10b in the second embodiment includes additional sources of information. Thus, in this embodiment other information is provided other than through the dynamic network server 22.

Firstly, the server 10b includes an address book 50 (or access to an existing address book). This identifies the user and the user's friends, as well as groups of users. Conveniently the address book used is the same address book 50 as used by the user for email or for other applications. This avoids the need for multiple address books. In an alternative arrangement, however, the address book 50 is provided just for the program guide application.

Additionally, the server 10b includes a calendar 52. Again this is conveniently the calendar already used by the user, though alternatively a special calendar may be provided for this application.

Additionally, the server stores preference information in preference information database 53. This relates to the content the user is interested to watch. This preference information is configured by the user.

The server 10b also includes a device list 54. This lists possible devices for each user as well as at least some of their properties such as attributes that do not change. For example, the size and resolution of a computer screen, processing power and storage capacity may be stored in the device list.

The guide generating server 24 is arranged in this embodiment to carry out a multi-dimensional weighted matching by rate and rank. The calculation is repeated periodically and used to update the generated program guide. In particular, the multi-dimensional weighted matching calculation uses the address book 50 to identify particularly trusted users from the address book. The address book may be used to store annotations revealing how trusted each user is and for which kind of recommendations. For example, one user may be trusted to make recommendations about user-generated content available generally on the internet while another user may be trusted to make recommendations about broadcast content.

The guide generating server also uses other dynamic or configured information (network, location, presence/role, calendar, devices, preference), as well as context data such as time of day.

The server provides a user interface 56 delivered to the user devices 8 through one or more device servers 6. In addition to the functionality already mentioned such as the program guide 28 the user interface 56 allows the user to update the list of favoured recommenders and how trustworthy the user finds each recommender. This information is stored in the address book 52. The user may also update preference information stored in preference database 53.

The device servers 6 also obtain dynamic resource information and pass it to the dynamic resource server 22.

The user interface 56 is formatted differently for each of the different user devices 8 to make appropriate use of each of the devices.

The user interface 56 may simply be a web-page driven by server 10 for some devices, or an API that is shipped to the device and interpreted on the device.

The user interface attaches to each item in the list of the program guide suitable input means (such as keys, a touch-screen, voice operation, etc.) for operating the item.

Figure 6:
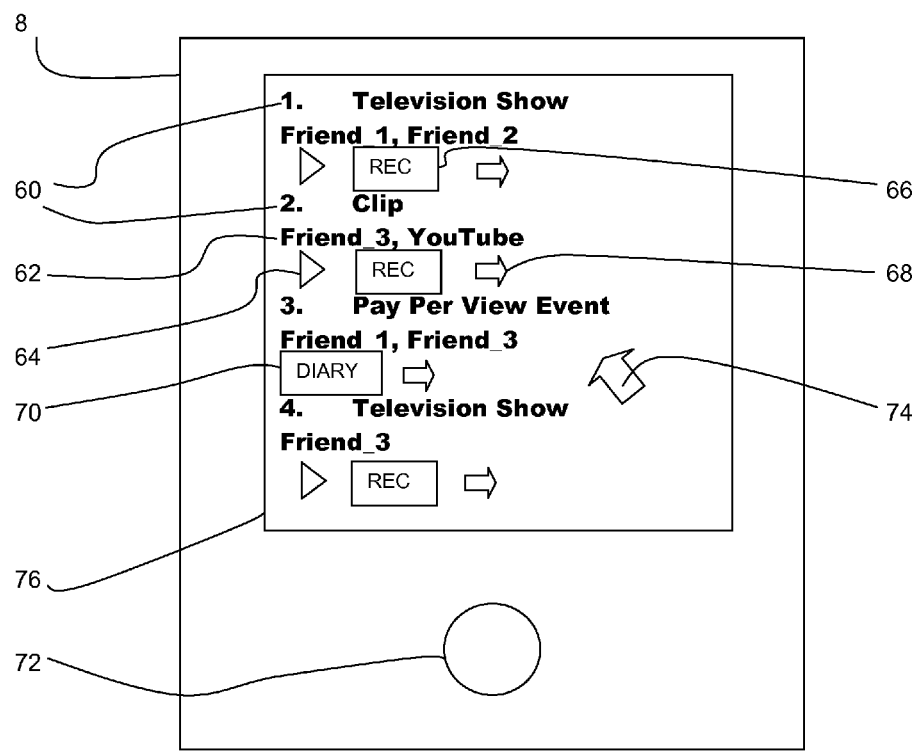
FIG. 6 illustrates a display generated by the second embodiment.

As illustrated in FIG. 6, each item 60 in the list is displayed together with a list of those recommending it 62 on display 76. Each item 60 also has a number of different key actions 64 . . . 70, selected as appropriate. The key actions may include, for example, play, download and store, record, forward recommendation, search, store event in calendar, delete, bar the recommending user. These may be selected by operating pointer controller 72 to move pointer 74 to select the action as appropriate.

For example, the first item on the list is a television show starting shortly. Accordingly, the list displays play 64, record 66 and forward 68 icons. The latter icon causes the user to recommend the item to a friend.

The second item contains user generated content available from a website and also includes play 64, forward icons 68. In this case, the record icon 66 causes the device to download and store the content.

The third item is a pay per view event that has not yet started. In this case, a diary icon 70 causes a reminder to be stored in the user's calendar 52 to alert the user when the pay per view event begins.

Other examples of possible items may be the url of the web site of an art exposition event, the url of a private file server with the user's own content or a simple note referring to content that will be delivered by another route, such as by email. Such content might include a humorous slide set.

The guide generating server 24 also uses the calendar 52 to obtain information about the user's schedule and make recommendations accordingly. The guide recommends content that will be available when the user is free accordingly. If the user has a meeting scheduled in half an hour, the guide may recommend shorter content.

Another feature of the second embodiment is that the guide generating server 24 uses information from external websites for public audience information 58, for example public ratings information. For example, when faced with a film, the guide accesses publicly available databases for ratings. These publicly available databases are themselves treated as recommenders and the user may rate the reliability of these databases as recommenders using user interface 56 and incorporating the reliability information in the address book.

For example, if a friend recommends a piece of user generated content, such as a video clip on a public website, the program guide generator 24 accesses the number of users who have already accessed that video clip as a decision criteria to push this recommendation high or low on the list. There is no need to select just popular content—indeed some users may prefer content that has not been viewed by many viewers. In other words, users may negatively rate sources of information in this way so that items highly recommended by an unfavoured source are pushed lower down the list or off it altogether.

In the embodiment illustrated, the message handler 4 is arranged to get this public information 58 through internet 2. Alternative embodiments provide separate access to the internet, for example from the program guide generator 24 itself, to obtain the public information.

The user interface 56 also allows users to recommend content to other users, i.e. the user interface 56 generates messages 12 to other users.

The user interface 56 also allows preferences to be set and stored. For example, one user may favour historical dramas and another news.

As well as messages 12 from other users the server 10 may also receive recommendation messages 12 from other servers such as content owners of broadcast content and aggregators. These are again listed by recommender and as for other types of recommender the user may store information in his address book as to how reliable the recommender is seen to be.

The program guide generator 24 functions by combining all the recommendations received, the ratings of the recommenders, public audience information where available, together with the dynamic information, the address book, calendar, and information about user's available devices, to deliver the program guide 28 through servers 6 to the user's devices 8. The guide is updated periodically.

The program guide operates using a rule based evaluation of a multi-dimensional weighted ranking. An alternative is to combine the information using a multi-dimensional vector, the dimensions representing the criteria for ranking, and then to use the length of the vector as an indication of the match.

The system of the second embodiment as a whole delivers a number of benefits. The integration of the ability to send recommendations in the program guide and user interface allows easy social interaction. These recommendations are screened by people that the user trusts.

The embodiment also enables the incorporation of the dynamic information in the recommendation as well as personal preferences both as to recommenders favoured by individual users and other preferences of the users.

Further, the incorporation of the public audience information provides a balance to the views of friends who may have a differing taste. Since public information providers are themselves treated as recommenders, individual users may select which information source is favoured by rating the recommenders accordingly. One user may favour the information in public information sources and another may favour information from his or her friends.

The above embodiments are provided purely by way of example and modifications are envisaged. For example, some, but not all, of the features discussed above with reference to the second embodiment may be included in the first embodiment.

The content database may be any suitable database, memory or information store, and may be recorded on any suitable medium, including ROM, RAM, hard disk, optical disk, flash memory, or any data storage means whatsoever.

The components of the server, including for example the message handler, the dynamic resource server, and the program guide generator may be implemented in hardware or software. Whatever the implementation, the components may be implemented as a single unit or as multiple units.

The second embodiment is described above to have a separate program guide 28 and user interface 56 but in other embodiments the two may be integrated in a single file sent by the server 10b to the devices including both program guide and user interface information.

Additionally, in addition to the public information, the server 10b may directly obtain recommendations from recommenders without waiting for the recommender to send recommendations. For example, the server 10b may send a message to a content owner to obtain information without requiring the content owner to send a message.

The system may be implemented on a single personal computer, a network of computers, and indeed may be implemented in a networked implementation spread around the plurality of user devices.

The invention claimed is:

1. A server for generating a program guide for at least one user relating to content for displaying on one or more user devices, comprising:
    a dynamic resource server arranged to obtain dynamic information relating to at least one user comprising details of which devices are associated with the user as well as properties of devices associated with the user;
    a message handler for receiving messages from a number of content recommenders comprising information about content items and an identity of the content recommenders; and
    a program guide generator arranged to dynamically produce a program guide personalized to the user from content descriptions, the dynamic information, and the received messages, and to output the program guide where the program guide displays multiple content recommenders and their respective content, the program guide comprising a list of content and a plurality of key actions associated with the content to permit user input to carry out actions on the content, the plurality of key actions comprising a forward recommendation key action that, when selected by the user, recommends a content item to a second user;
    in which the dynamic information used by the program guide generator to produce the program guide comprises real-time information about the user's location, network attachment of the devices associated with the user, present status of the user, or combinations thereof.

2. The server of claim 1, further comprising a content database for storing content descriptions of content items and the identity of any entities recommending the respective content items, the message handler configured to update the content database based on the received messages.

3. The server of claim 1, in which the dynamic information used by the program guide generator to generate the program guide information comprises information obtained from a calendar about a user's schedule.

4. The server of claim 1, in which the program guide generator is further arranged to use user preference information relating to the preferences of the user to generate the program guide information.

5. The server of claim 1, in which the program guide generator is further arranged to use information regarding each of the user's location, network attachment of the devices associated with the user, present status of the user and user preference information to generate the program guide information.

6. The server of claim 1, where the program guide generator is arranged to allow the user to create a list of favored recommenders.

7. The server of claim 1, wherein the server is arranged to send messages to the recommenders without waiting for the recommenders to send recommendations.

8. The server of claim 1, wherein the program guide is arranged to associate a level of trust with the recommenders.

9. The server of claim 1, in which the message used by the program guide generator to generate the program guide information comprises a content comments field.

10. A computer program product for displaying a program guide to a user comprising:
    a non-transitory computer readable medium comprising computer usable program code embodied therewith, the computer usable program code comprising:
        computer usable program code to, when executed by a processor, display a list of items of content on a display device comprising content information together with key action controls associated with items of content, the key action controls comprising a forward key action control;
        computer usable program code to, when executed by a processor, receive user input selecting at least one key action control including the forward key action control associated with an item of content; and
        computer usable program code to, when executed by a processor, carry out an action associated with the key action control on the item of content associated with the key action control by forwarding a message recommending the item of content to another user,
        in which the list of items of content are displayed based on messages with content recommendations received by a message handler from a number of content recommenders and in which multiple content recommenders are displayed with their respective items of content from the list.

11. The computer program product of claim 10, in which the key action controls comprise a play key action control and a store key action control;
    in which carrying out an action comprises playing the item of content when user input selecting the play key action control is received; and
    in which carrying out an action comprises storing the item of content when user input selecting the store key action control is received.

12. The computer program product of claim 10, in which the program guide is a personalized dynamic program guide personalized to the user from content descriptions and from dynamic information, comprising real-time information about bandwidth of a device associated with the user.

13. A method of displaying a program guide to a user, comprising:
    receiving content recommendations indicating content and the entity recommending that content;
    obtaining real-time dynamic information regarding the user's location, network attachment of devices associated with the user, present status of the user, or combinations thereof;
    generating a program guide for the user by using combining the content recommendations and the dynamic information where said program guide displays multiple content recommenders and their respective content;
    outputting the program guide to a device of the user;
    displaying the program guide on a user device comprising displaying content information together with key action controls associated with items of content;
    receiving user input selecting at least one key action control; and
    carrying out an action associated with the key action control on the item of content associated with the key action control; wherein
    the key action controls comprise a forward key action control;
    receiving user input comprises receiving user input selecting the forward key action control associated with an item of content; and
    carrying out an action comprises forwarding a message recommending the item of content to another user.

14. The method of claim 13, in which generating the program guide comprises using user preference information relating to the preferences of the user.

15. The method of claim 13, in which the key action controls comprise a play key action control and a store key action control;
   in which carrying out an action comprises playing the item of content when user input selecting the play key action control is received; and
   in which carrying out an action comprises storing the item of content when user input selecting the store key action control is received.

* * * * *